United States Patent
Kato

(10) Patent No.: US 11,664,167 B2
(45) Date of Patent: May 30, 2023

(54) MULTI-LAYER CERAMIC ELECTRONIC COMPONENT

(71) Applicant: Taiyo Yuden Co., Ltd., Tokyo (JP)

(72) Inventor: Yoichi Kato, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 63 days.

(21) Appl. No.: 17/104,682

(22) Filed: Nov. 25, 2020

(65) Prior Publication Data

US 2021/0159018 A1 May 27, 2021

(30) Foreign Application Priority Data

Nov. 27, 2019 (JP) .............................. JP2019-213979

(51) Int. Cl.
| | | |
|---|---|---|
| *H01G 4/30* | (2006.01) | |
| *H01G 4/008* | (2006.01) | |
| *H01G 4/012* | (2006.01) | |
| *H01G 4/12* | (2006.01) | |

(52) U.S. Cl.
CPC .............. *H01G 4/30* (2013.01); *H01G 4/008* (2013.01); *H01G 4/012* (2013.01); *H01G 4/1218* (2013.01)

(58) Field of Classification Search
CPC .......... H01G 4/30; H01G 4/12; H01G 4/1218; H01G 4/005; H01G 4/008; H10G 4/012; H10G 4/12
USPC .... 361/306.3, 309, 321.2, 301.4, 303, 321.1
See application file for complete search history.

(56) References Cited

U.S. PATENT DOCUMENTS

| | | | |
|---|---|---|---|
| 2012/0234462 A1 | 9/2012 | Matsui et al. | ............. 156/89.12 |
| 2013/0094123 A1* | 4/2013 | Ahn | ........................ H01G 2/065 |
| | | | 361/321.1 |
| 2013/0107417 A1* | 5/2013 | Cho | ........................ H01G 4/012 |
| | | | 29/25.42 |
| 2013/0107422 A1* | 5/2013 | Lee | .......................... H01G 4/12 |
| | | | 336/200 |
| 2015/0136462 A1* | 5/2015 | Lee | .......................... H01G 4/30 |
| | | | 361/301.4 |
| 2017/0103855 A1* | 4/2017 | You | ........................ H01G 4/248 |
| 2017/0213649 A1* | 7/2017 | Kato | ....................... H01G 4/232 |
| 2017/0301470 A1* | 10/2017 | Asai | ........................ H01G 4/232 |
| 2019/0164698 A1* | 5/2019 | Kato | ....................... H01G 4/248 |
| 2020/0118746 A1* | 4/2020 | Matsui | ................... H01G 4/012 |

FOREIGN PATENT DOCUMENTS

| | | | |
|---|---|---|---|
| JP | 2012-209539 A | | 10/2012 |
| JP | 2019117817 A | * | 7/2019 |

* cited by examiner

*Primary Examiner* — Arun Ramaswamy
(74) *Attorney, Agent, or Firm* — Stein IP, LLC

(57) ABSTRACT

A multi-layer ceramic electronic component includes: a multi-layer unit including ceramic layers laminated in a direction of a first axis, internal electrodes disposed between the ceramic layers, and first and second side surfaces on which end portions of the internal electrodes in a direction of a second axis orthogonal to the first axis are positioned; and first and second side margins that cover the first and second side surfaces, respectively. When the first and second side margins are each divided equally into first and second regions along a plane perpendicular to the direction of the first axis, the first side margin has a larger average thickness in the first region than in the second region, and the second side margin has a larger average thickness in the second region than in the first region.

9 Claims, 9 Drawing Sheets

MULTI-LAYER CERAMIC ELECTRONIC COMPONENT

CROSS-REFERENCE TO RELATED APPLICATIONS

This application is based upon and claims the benefit of priority from the corresponding Japanese Patent Application No. 2019-213979 filed Nov. 27, 2019, the entire contents of which are hereby incorporated by reference.

BACKGROUND ART

The present disclosure relates to a multi-layer ceramic electronic component including side margins provided in a later step.

There is known a technique of providing side margins in a later step in the process of producing a multi-layer ceramic capacitor (see, for example, Japanese Patent Application Laid-open No. 2012-209539). This technique is advantageous for the miniaturization and increase in capacitance of the multi-layer ceramic capacitor because of allowing the thin side margins to reliably protect the side surfaces of the multi-layer unit, from which internal electrodes are exposed.

For example, in the method of producing a multi-layer ceramic capacitor, which is disclosed in Japanese Patent Application Laid-open No. 2012-209539, a multi-layer sheet including laminated ceramic sheets on which internal electrodes are printed is cut to produce a plurality of multi-layer units having side surfaces that are cut surfaces from which the internal electrodes are exposed. Subsequently, a ceramic sheet is punched out with the side surface of the multi-layer unit, to form a side margin on the side surface of the multi-layer unit.

SUMMARY OF THE INVENTION

However, in the technique of providing side margins in a later step as described above, the multi-layer unit and the side margins exhibit different contraction behaviors during sintering, that is, the side margins having a low density tend to largely contract more than the multi-layer unit having a high density. This may reduce the performance of the multi-layer ceramic capacitor when stress is applied to the inside of the multi-layer unit.

In view of the circumstances as described above, it is desirable to provide a multi-layer ceramic electronic component capable of suppressing reduction in performance due to the stress applied during sintering.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one aspect, the present disclosure provides a multi-layer ceramic electronic component including a multi-layer unit, and a first side margin and a second side margin.

The multi-layer unit includes ceramic layers laminated in a direction of a first axis, internal electrodes disposed between the ceramic layers, and a first side surface and a second side surface on which end portions of the internal electrodes in a direction of a second axis orthogonal to the first axis are positioned.

The first side margin and the second side margin cover the first side surface and the second side surface, respectively.

When the first side margin and the second side margin are each divided equally into a first region and a second region along a plane perpendicular to the direction of the first axis, the first side margin has a larger average thickness in the first region than in the second region, and the second side margin has a larger average thickness in the second region than in the first region.

During sintering in the process of producing the multi-layer ceramic electronic component, a force caused by the contraction of the first side margin and the second side margin is applied to the first side surface and the second side surface of the multi-layer unit, and thus a tensile stress is applied to the inside of the multi-layer unit.

Thus, in the multi-layer unit, the crystal constituting the first and second internal electrodes is likely to cause grain growth along the direction of the tensile stress applied to the inside of the multi-layer unit. When the grain growth of the first and second internal electrodes extremely progress in the thickness direction (the direction of the first axis) in the multi-layer unit, the first and second internal electrodes are liable to be discontinuous in the in-plane direction.

In contrast to this, in the multi-layer unit having the configuration described above, a larger force is applied to the first side surface of the multi-layer unit in the first region including the thick first side margin than in the second region. Meanwhile, a larger force is applied to the second side surface of the multi-layer unit in the second region including the thick second side margin than in the first region. Thus, during sintering, the direction of the tensile stress applied to the inside of the multi-layer unit is inclined with respect to the direction of the first axis, which suppresses the grain growth of the first and second internal electrodes in the thickness direction. Thus, the multi-layer ceramic electronic component having such a configuration can have the continuity of the first and second internal electrodes in the in-plane direction.

Each of the first side margin and the second side margin may have an outer surface extending along a plane orthogonal to the second axis.

This configuration can achieve the first side margin and the second side margin each having the thickness distribution as described above while keeping a general rectangular parallelepiped shape of the ceramic body.

The average thickness of the first side margin in the first region may be larger than the average thickness of the second side margin in the first region.

The average thickness of the second side margin in the second region may be larger than the average thickness of the first side margin in the second region.

The average thickness of the first side margin in the first region may be equal to the average thickness of the second side margin in the second region.

The average thickness of the first side margin in the second region may be equal to the average thickness of the second side margin in the first region.

In another aspect, the present disclosure provides a method of producing a multi-layer ceramic electronic component, the method including: producing a multi-layer sheet including ceramic layers laminated in a direction of a first axis, and internal electrodes disposed between the ceramic layers; producing a multi-layer unit by cutting and singulating the multi-layer sheet, the multi-layer unit having a first side surface and a second side surface being cut surfaces from which end portions of the internal electrodes in a direction of a second axis orthogonal to the first axis are exposed, and being inclined in a common direction with respect to a plane orthogonal to the second axis; and forming a first side margin and a second side margin on the first side surface and the second side surface, respectively, the first side margin and the second side margin each having an outer surface extending along the plane orthogonal to the second axis.

The multi-layer sheet may be cut with a push-cutting blade vibrated in the direction of the second axis.

The forming a first side margin and a second side margin may include using a side margin sheet. In this case, the side margin sheet may be attached to the first side surface and the second side surface while deforming the side margin sheet along a shape of each of the first side surface and the second side surface. Further, the side margin sheet may be pressed using a pressing surface with a high rigidity extending along the plane orthogonal to the second axis.

As described above, according to the present disclosure, it is possible to provide a multi-layer ceramic electronic component capable of suppressing reduction in performance due to the stress applied during sintering.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, a multi-layer ceramic capacitor 10 according to an embodiment of the present disclosure will be described with reference to the drawings. Note that FIGS. 1 to 11 show an X axis, a Y axis, and a Z axis orthogonal to one another as appropriate. The X axis, the Y axis, and the Z axis define a fixed coordinate system that is fixed with respect to the multi-layer ceramic capacitor 10.

1. Configuration of Multi-Layer Ceramic Capacitor 10

Figure 1:
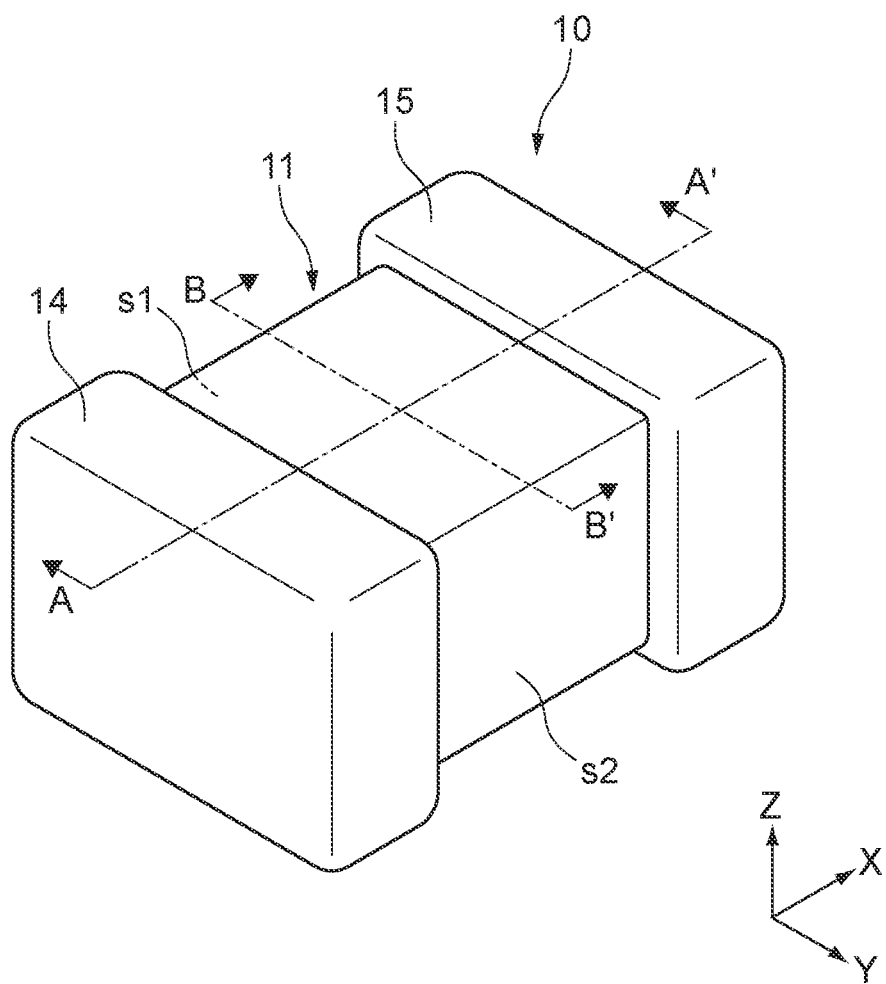
FIG. 1 is a perspective view of a multi-layer ceramic capacitor according to an embodiment of the present disclosure.
Figure 2:
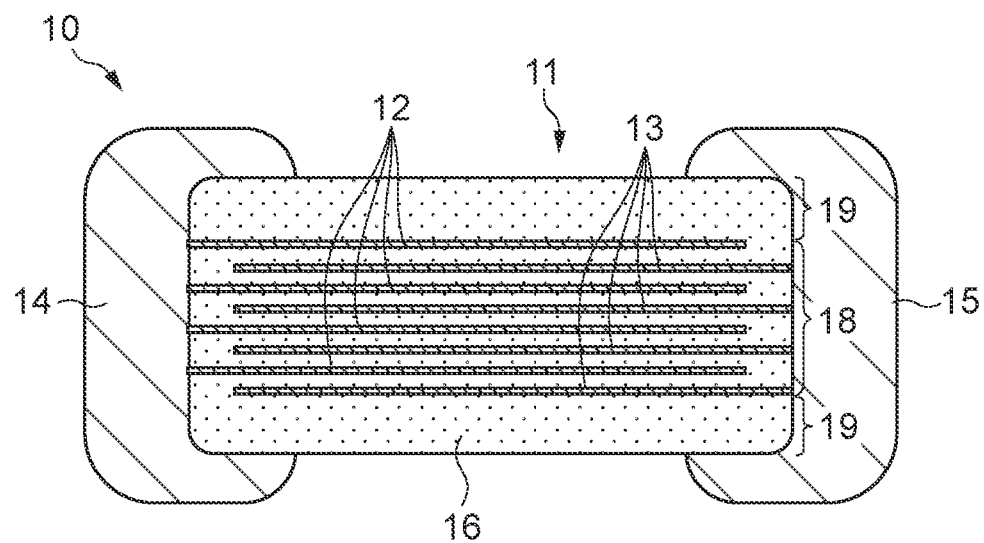
FIG. 2 is a cross-sectional view of the multi-layer ceramic capacitor taken along the A-A' line in FIG. 1.
Figure 3:
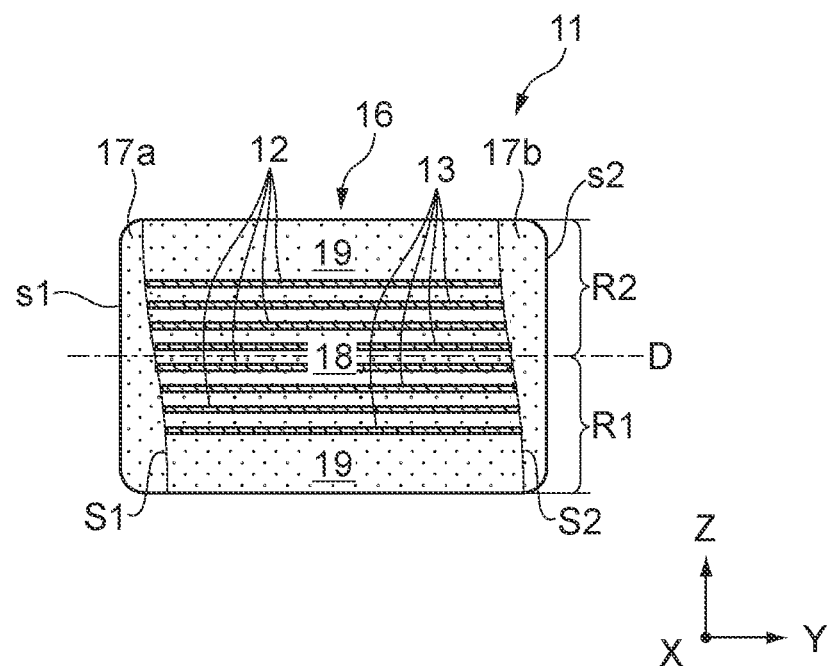
FIG. 3 is a cross-sectional view of the multi-layer ceramic capacitor taken along the B-B' line in FIG. 1.

FIGS. 1 to 3 each show the multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The ceramic body 11 is formed into a rectangular parallelepiped shape having first and second end surfaces orthogonal to the X axis, first and second side surfaces s1 and s2 orthogonal to the Y axis, and first and second main surfaces orthogonal to the Z axis.

The first and second end surfaces, the first and second side surfaces s1 and s2, and the first and second main surfaces of the ceramic body 11 are each configured as a flat surface. The flat surface according to this embodiment does not need to be strictly flat if the surface may be recognized as being flat when viewed as a whole. For example, the flat surface according to this embodiment also includes a surface having fine irregularities thereon, a surface having a gently curved shape in a predetermined range, and the like.

The first external electrode 14 and the second external electrode 15 cover both the end surfaces of the ceramic body 11 and face each other in the X-axis direction while sandwiching the ceramic body 11 therebetween. The first external electrode 14 and the second external electrode 15 extend to the first and second main surfaces and the first and second side surfaces s1 and s2 from the end surfaces of the ceramic body 11. With this configuration, the first external electrode 14 and the second external electrode 15 have U-shaped cross sections parallel to the X-Z plane and the X-Y plane.

Note that the shapes of the first and second external electrodes 14 and 15 are not limited to those shown in FIG. 1. For example, the first and second external electrodes 14 and 15 may extend to one of the main surfaces from both the end surfaces of the ceramic body 11 and have L-shaped cross sections parallel to the X-Z plane. Alternatively, the first and second external electrodes 14 and 15 do not necessarily have to extend to any of the main surfaces and side surfaces s1 and s2.

The first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like or an alloy of them.

The ceramic body 11 is formed of dielectric ceramics and includes a multi-layer unit 16 and first and second side margins 17a and 17b. The multi-layer unit 16 has first and second end surfaces orthogonal to the X axis and first and second main surfaces orthogonal to the Z axis. Further, the multi-layer unit 16 has first and second side surfaces S1 and S2 facing each other in the Y-axis direction.

In the multi-layer unit 16, the first and second side surfaces S1 and S2 are each configured as an inclined surface that is inclined in a common direction (leftward on the Y-axis from the bottom to the top in the Z-axis direction). With this configuration, in the multi-layer unit 16, the first side surface S1 protrudes leftward in the Y-axis direction on the upper portion in the Z-axis direction, and the second side surface S2 is recessed leftward in the Y-axis direction on the upper portion in the Z-axis direction.

The multi-layer unit 16 has a configuration in which a plurality of flat plate-like ceramic layers extending along the X-Y plane are laminated in the Z-axis direction. The multi-layer unit 16 includes a capacitance forming unit 18 and covers 19. The covers 19 cover the capacitance forming unit 18 from above and below in the Z-axis direction and constitute the main surfaces of the multi-layer unit 16.

The capacitance forming unit 18 includes first internal electrodes 12 and second internal electrodes 13. The first and second internal electrodes 12 and 13 each have a sheet-like shape extending along the X-Y plane and are each disposed between the ceramic layers. The first and second internal electrodes 12 and 13 are alternately disposed along the Z-axis direction. In other words, the first internal electrode 12 and the second internal electrode 13 face each other in the Z-axis direction while sandwiching the ceramic layer therebetween.

The first internal electrodes 12 are drawn to the end surface covered with the first external electrode 14. Meanwhile, the second internal electrodes 13 are drawn to the end surface covered with the second external electrode 15. With this configuration, the first internal electrodes 12 are connected to the first external electrode 14, and the second internal electrodes 13 are connected to the second external electrode 15.

With such a configuration, when a voltage is applied between the first external electrode 14 and the second external electrode 15 in the multi-layer ceramic capacitor 10, the voltage is applied to the ceramic layers between the first internal electrodes 12 and the second internal electrodes 13. This allows the multi-layer ceramic capacitor 10 to store charge corresponding to the voltage applied between the first external electrode 14 and the second external electrode 15.

In the ceramic body 11, in order to increase capacitances of the respective ceramic layers provided between the first internal electrodes 12 and the second internal electrodes 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

Note that the ceramic layer may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal mainly containing copper (Cu), palladium (Pd), platinum (Pt), silver (Ag), gold (Au), or the like or an alloy of them.

The first and second internal electrodes 12 and 13 are formed over the entire width of the capacitance forming unit 18 in the Y-axis direction, and both end portions of the first and second internal electrodes 12 and 13 in the Y-axis direction are positioned on the first and second side surfaces S1 and S2 of the multi-layer unit 16. The first and second side margins 17a and 17b cover the first and second side surfaces S1 and S2 of the multi-layer unit 16, respectively. This configuration can ensure insulation properties between the first internal electrodes 12 and the second internal electrodes 13 on the first and second side surfaces S1 and S2 of the multi-layer unit 16.

Specifically, the first side margin 17a covers the first side surface S1 of the multi-layer unit 16, and the second side margin 17b covers the second side surface S2 of the multi-layer unit 16. In other words, the outer surface of the first side margin 17a is the first side surface s1 of the ceramic body 11, and the outer surface of the second side margin 17b is the second side surface s2 of the ceramic body 11.

The cross sections of the first and second side margins 17a and 17b taken along the Y-Z plane shown in FIG. 3 are asymmetric with respect to the central axis passing through the center of the ceramic body 11 in the Y-axis direction and being parallel to the Z-axis direction. In other words, the first and second side margins 17a and 17b have different distributions of the thickness, which is the dimension in the Y-axis direction, along the Z-axis direction.

FIG. 3 shows a bisecting plane D, which is a flat plane that is perpendicular to the Z axis and equally divides each of the first and second side margins 17a and 17b into two in the Z-axis direction, to obtain first and second regions R1 and R2. In other words, in each of the first and second side margins 17a and 17b according to this embodiment, the lower half region in the Z-axis direction is assumed as the first region R1, and the upper half region in the Z-axis direction is assumed as the second region R2.

The first and second side margins 17a and 17b have different average thicknesses between the first region R1 and the second region R2. Specifically, the first side margin 17a has a larger average thickness in the first region R1 than in the second region R2. The second side margin 17b has a larger average thickness in the second region R2 than in the first region R1.

In other words, the first side margin 17a has a larger average thickness and the second side margin 17b has a smaller average thickness in the first region R1 on the lower part in the Z-axis direction. Meanwhile, the first side margin 17a has a smaller average thickness and the second side margin 17b has a larger average thickness in the second region R2 on the upper part in the Z-axis direction.

In the multi-layer ceramic capacitor 10, when the first and second side surfaces S1 and S2 of the multi-layer unit 16 are made inclined, the first and second side margins 17a and 17b can be provided with the thickness distribution as described above while keeping the ceramic body 11 in a general shape like a rectangular parallelepiped. This allows the multi-layer ceramic capacitor 10 to easily substitute for an existing product.

Note that, in the multi-layer ceramic capacitor 10, the average thicknesses of the first and second side margins 17a and 17b in the first and second regions R1 and R2 only need to satisfy the relationship described above, and the shape of the first and second side surfaces S1 and S2 of the multi-layer unit 16 can be variously modified. For example, the first and second side surfaces S1 and S2 of the multi-layer unit 16 may have a liner or wavy cross-sectional shape.

In the multi-layer ceramic capacitor 10, the magnitude relationship of the average thickness between the first and second regions R1 and R2 is made different between the first and second side margins 17a and 17b as described above, and thus the direction of a tensile stress applied to the inside of the multi-layer unit 16 can be controlled during sintering in the production process. This can suppress reduction in performance of the multi-layer ceramic capacitor 10.

2. Production Method for Multi-Layer Ceramic Capacitor 10

Figure 4:
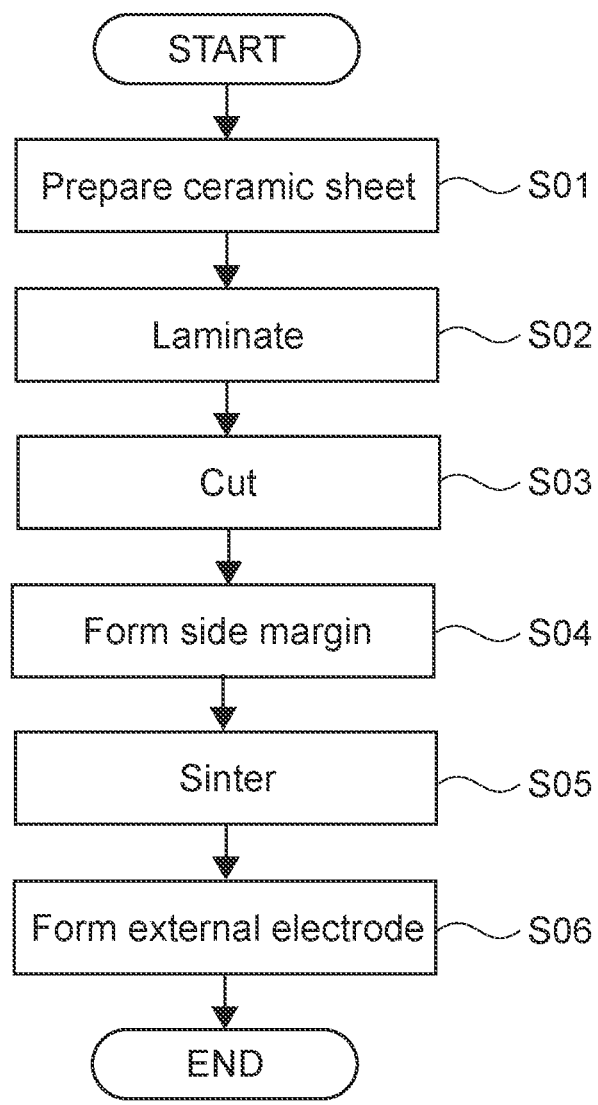
FIG. 4 is a flowchart showing a production method for the multi-layer ceramic capacitor.
Figure 5:
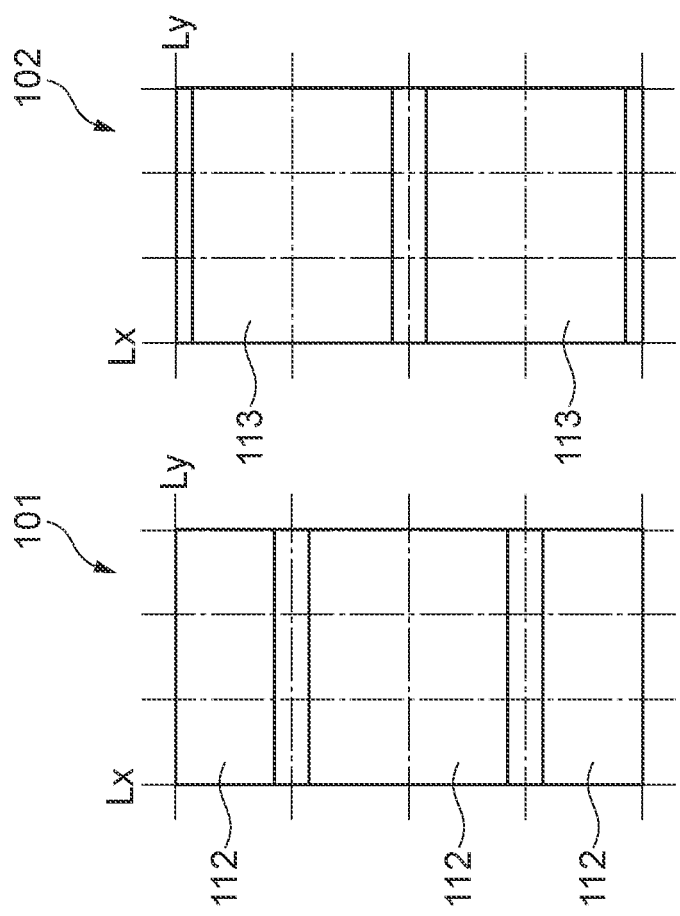
FIGS. 5A, 5B, and 5C are plan views of ceramic sheets, which are prepared in the process of preparing ceramic sheets in the production method.

FIG. 4 is a flowchart showing a production method for the multi-layer ceramic capacitor 10 according to this embodiment. FIGS. 5A to 11 are views each showing a production process for the multi-layer ceramic capacitor 10. Hereinafter, the production method for the multi-layer ceramic capacitor 10 will be described along FIG. 4 with reference to FIGS. 5A to 11 as appropriate.

2.1 Step S01: Preparation of Ceramic Sheet

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are configured as unsintered dielectric green sheets mainly containing dielectric ceramics.

The first, second, and third ceramic sheets 101, 102, and 103 are each formed into a sheet shape by using a roll coater or a doctor blade, for example. The thickness of each of the first and second ceramic sheets 101 and 102 is adjusted in accordance with the thickness of the ceramic layer of the sintered capacitance forming unit 18. The thickness of the third ceramic sheet 103 is adjustable as appropriate.

FIGS. 5A, 5B, and 5C are plan views of the first, second, and third ceramic sheets 101, 102, and 103, respectively. At this stage, the first, second, and third ceramic sheets 101, 102, and 103 are each configured as a large-sized sheet that is not singulated. FIGS. 5A, 5B, and 5C each show cutting lines Lx and Ly to be used when the sheets are singulated into the multi-layer ceramic capacitors 10. The cutting lines Lx are parallel to the X axis, and the cutting lines Ly are parallel to the Y axis.

As shown in FIGS. 5A, 5B, and 5C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. Note that no internal electrodes are formed on the third ceramic sheet 103 corresponding to the cover 19.

The first internal electrodes 112 and the second internal electrodes 113 can be formed by applying an optional electrically conductive paste to the first ceramic sheets 101 and the second ceramic sheets 102, respectively. The method of applying the electrically conductive paste is optionally selectable from publicly known techniques. For example, for the application of the electrically conductive paste, a screen printing method or a gravure printing method can be used.

In the first and second internal electrodes 112 and 113, gaps are formed in the X-axis direction along the cutting lines Ly for every other cutting line Ly. The gaps between the first internal electrodes 112 and the gaps between the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

2.2 Step S02: Lamination

Figure 6:
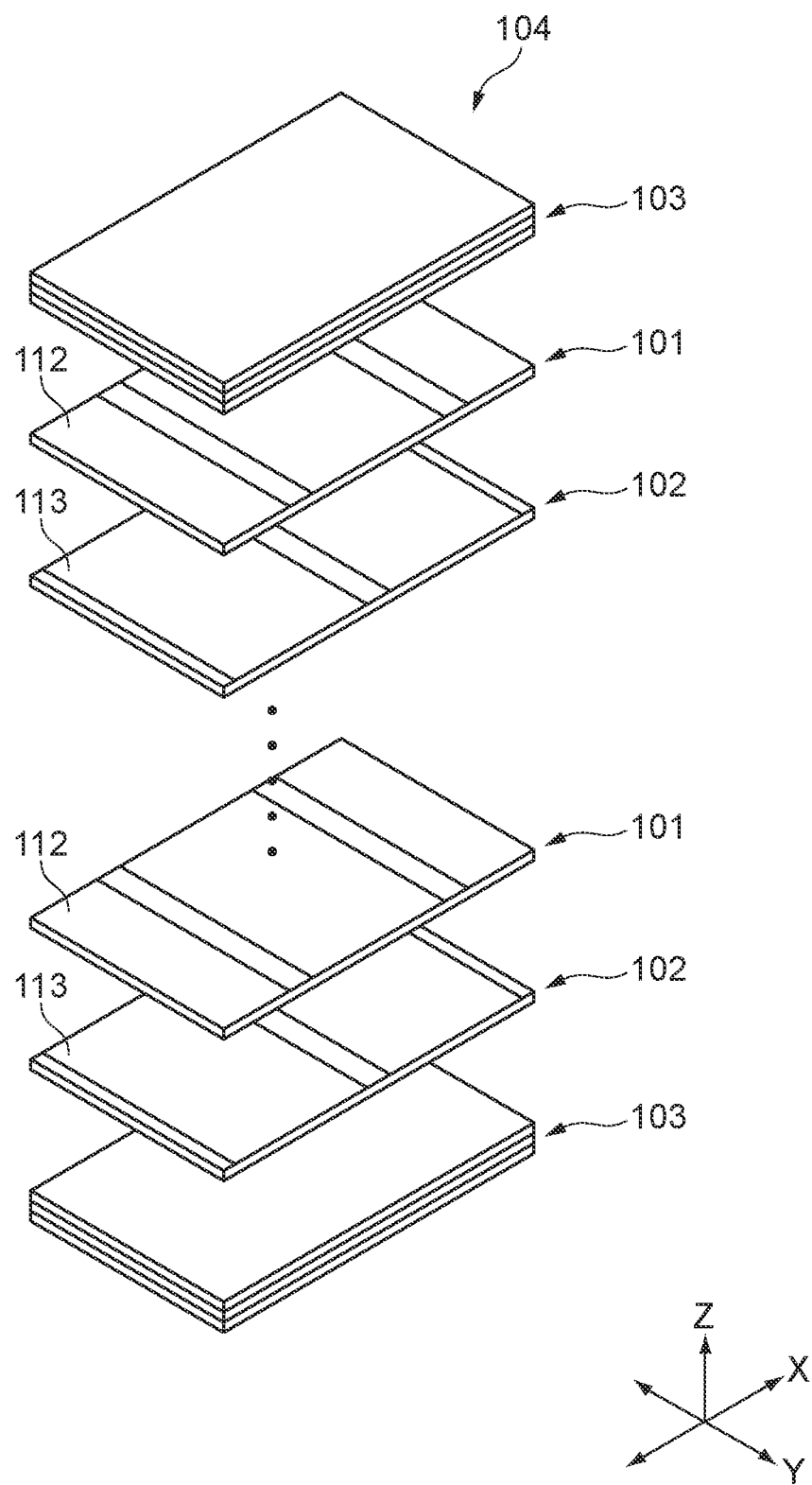
FIG. 6 is a perspective view showing a lamination process in the production method.

In Step S02, the first, second, and third ceramic sheets 101, 102, and 103 prepared in Step S01 are laminated as shown in FIG. 6, to produce a multi-layer sheet 104. In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the upper and lower surfaces of the alternately laminated first and second ceramic sheets 101 and 102 in the Z-axis direction. Note that the example of FIG. 6 shows the three third ceramic sheets 103 laminated on each of the upper and lower surfaces, but the number of third ceramic sheets 103 to be laminated can be determined as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 104.

2.3 Step S03: Cutting

In Step S03, the multi-layer sheet 104 obtained in Step S02 is cut along the cutting lines Lx and Ly, to produce unsintered multi-layer units 116. Each of the multi-layer units 116 corresponds to a multi-layer unit 16 to be obtained after sintering. The multi-layer sheet 104 can be cut with a push-cutting blade, a rotary blade, or the like.

Figure 7:
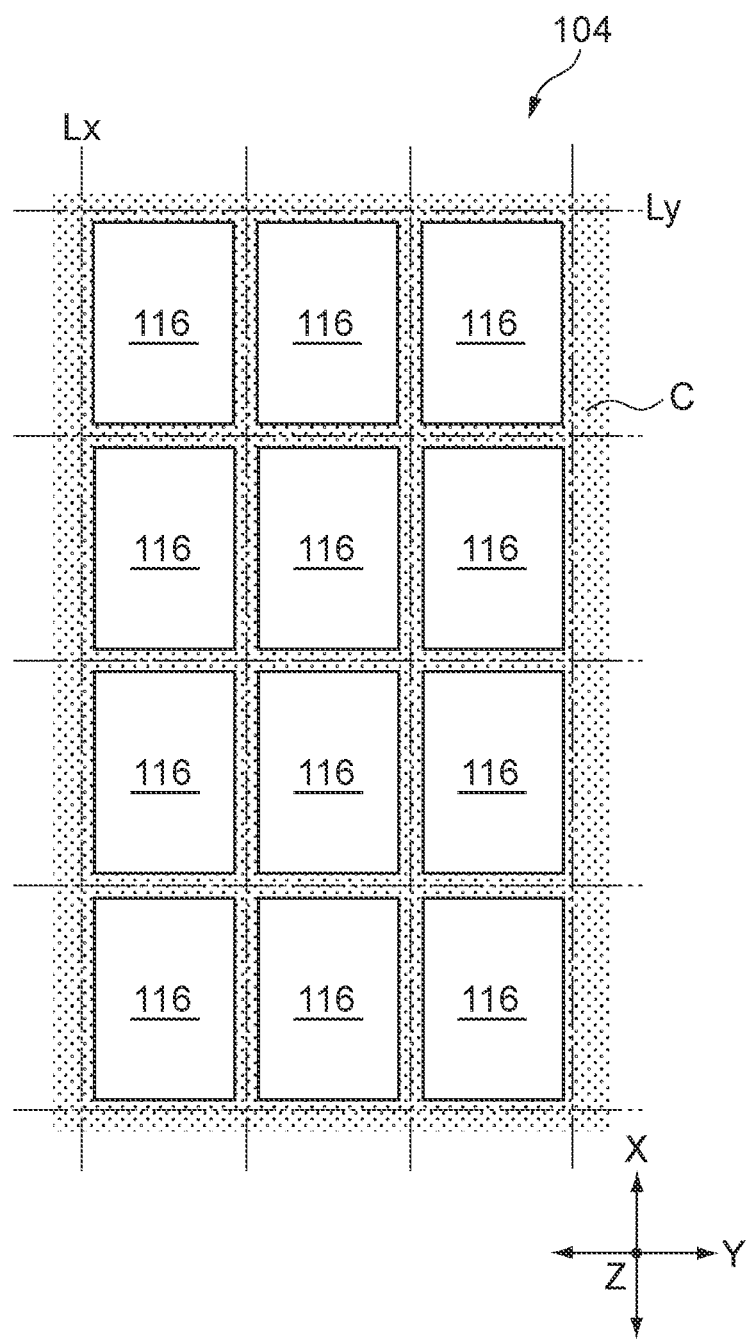
FIG. 7 is a plan view showing a cutting process in the production method.
Figure 8A:
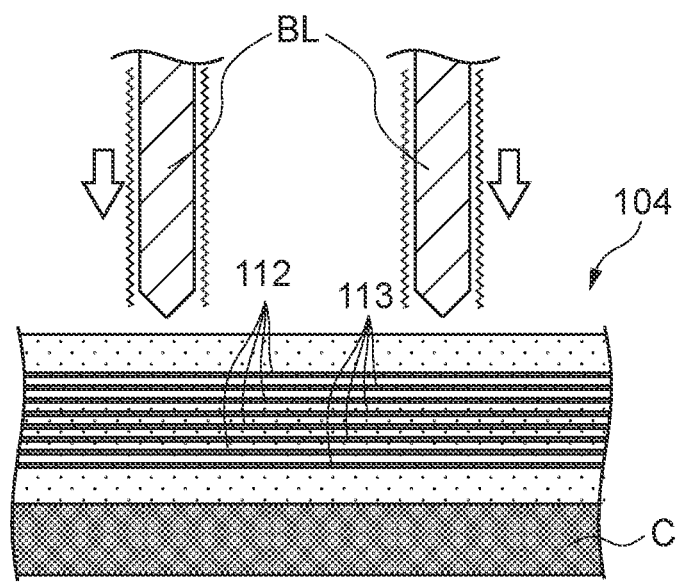
FIGS. 8A and 8B are partially cross-sectional views showing the cutting process in the production method.
Figure 8B:
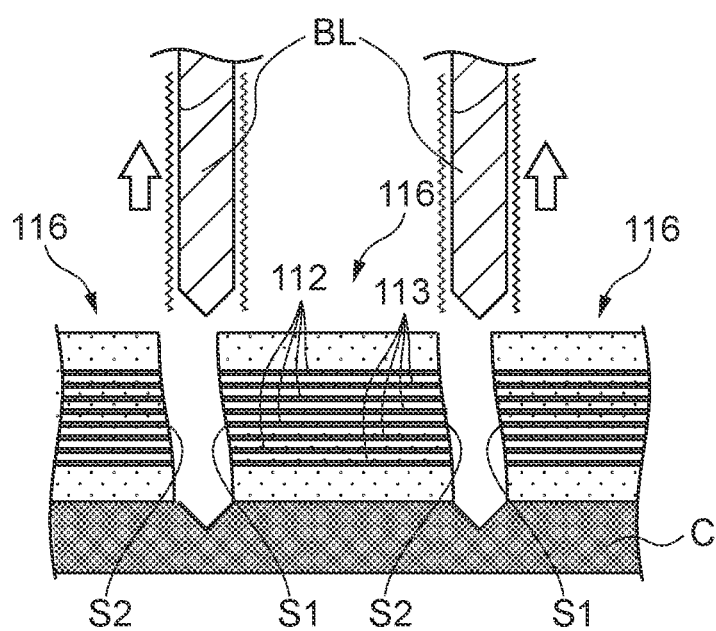

FIGS. 7, 8A, and 8B are schematic views for describing an example of Step S03. FIG. 7 is a plan view of the multi-layer sheet 104. FIGS. 8A and 8B are cross-sectional views of the multi-layer sheet 104 taken along the Y-Z plane. The multi-layer sheet 104 is cut along the cutting lines Lx and Ly with a push-cutting blade BL while the multi-layer sheet 104 is held by an adhesive cut sheet C such as a foamed release sheet.

First, as shown in FIG. 8A, the push-cutting blade BL is disposed above the multi-layer sheet 104 in the Z-axis direction, with the tip of the push-cutting blade BL facing the multi-layer sheet 104 downward in the Z-axis direction. Next, from the state shown in FIG. 8A, the push-cutting blade BL is moved downward in the Z-axis direction until the tip of the push-cutting blade BL reaches the cut sheet C to penetrate the multi-layer sheet 104.

Subsequently, as shown in FIG. 8B, the push-cutting blade BL is moved upward in the Z-axis direction and pulled out of the multi-layer sheet 104. Thus, the multi-layer sheet 104 is cut in the X-axis and Y-axis directions, thus forming a plurality of multi-layer units 116 each having the first and second side surfaces S1 and S2 from which the first and second internal electrodes 112 and 113 are exposed in the Y-axis direction.

In the example shown in FIGS. 8A and 8B, in the process of cutting the multi-layer sheet 104, the push-cutting blade BL is vibrated to right and left in the Y-axis direction at a predetermined vibration frequency and vibration amplitude. Thus, the cut surfaces in the multi-layer sheet 104 are curved by the push-cutting blade BL, which allows the first and second side surfaces S1 and S2 of each multi-layer unit 116 to be inclined surfaces as shown in FIG. 8B.

2.4 Step S04: Formation of Side Margin

Figure 9:
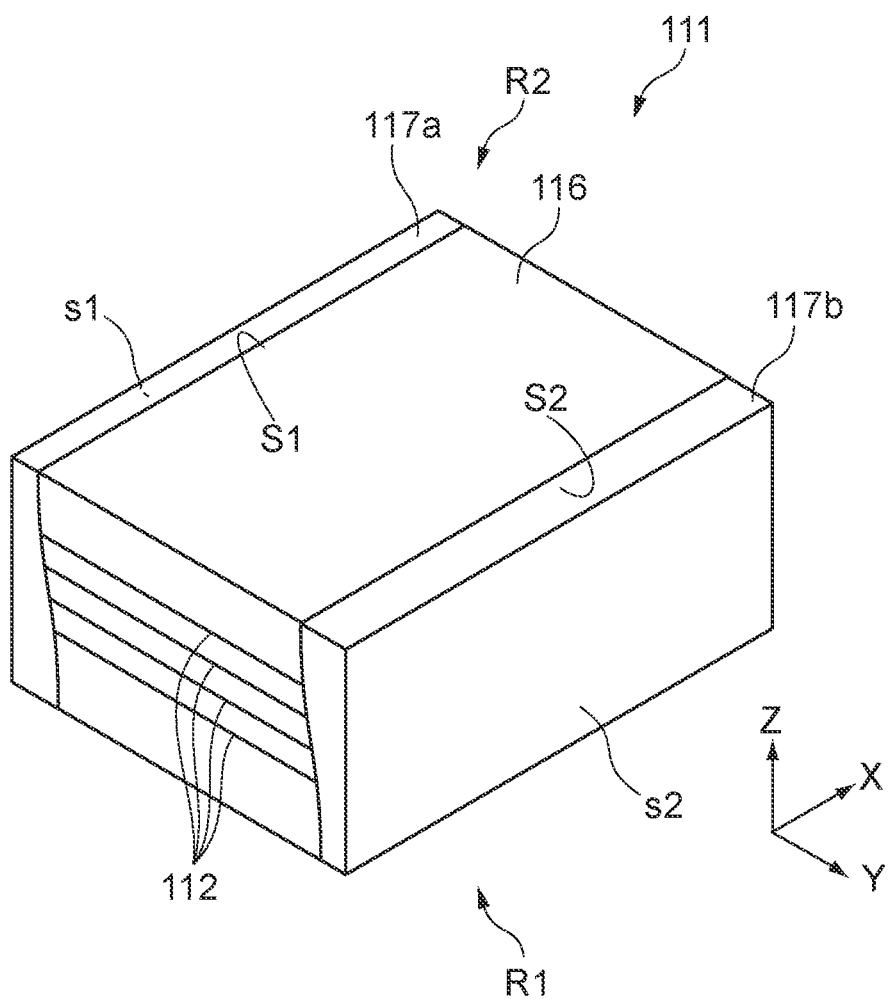
FIG. 9 is a perspective view of an unsintered ceramic body obtained in the process of forming side margins in the production method.

In Step S04, an unsintered first side margin 117a is provided to the first side surface S1, and an unsintered second side margin 117b is provided to the second side surface S2 of the multi-layer unit 116 obtained in Step S03. With this configuration, an unsintered ceramic body 111 having the side surfaces s1 and s2 extending along the plane orthogonal to the Y axis is produced as shown in FIG. 9.

The unsintered first and second side margins 117a and 117b can be formed using, for example, a ceramic sheet (side margin sheet) or ceramic slurry. In the case of using a side margin sheet, the side margin sheet is pressed against each of the first and second side surfaces S1 and S2 of the multi-layer unit 116 by using a pressing surface with a high rigidity extending along the X-Z plane. Thus, the side margin sheet can be attached to each of the first and second side surfaces S1 and S2 of the multi-layer unit 116 while being deformed along the shape of each of the first and second side surfaces S1 and S2 of the multi-layer unit 116.

The unsintered first and second side margins 117a and 117b fail to be pressure-bonded to the first and second side surfaces S1 and S2 of the multi-layer unit 116 with a high pressure for the purpose of preventing delamination in the multi-layer unit 116. For that reason, in the ceramic body 111, the unsintered first and second side margins 117a and 117b have a lower density than the multi-layer unit 116.

2.5 Step S05: Sintering

In Step S05, the ceramic body 111 shown in FIG. 9, which is obtained in Step S04, is sintered to produce the ceramic body 11 of the multi-layer ceramic capacitor 10 shown in FIGS. 1 to 3. In other words, through Step S05, the multi-layer unit 116 becomes the multi-layer unit 16, and the side margins 117a and 117b become the side margins 17a and 17b.

A sintering temperature in Step S05 can be determined on the basis of a sintering temperature for the ceramic body 111. For example, if a barium titanate ($BaTiO_3$) based material is used, the sintering temperature can be set to approximately 1000 to 1300° C. Further, sintering can be performed in a reduction atmosphere or a low-oxygen partial pressure atmosphere, for example.

Figure 10:
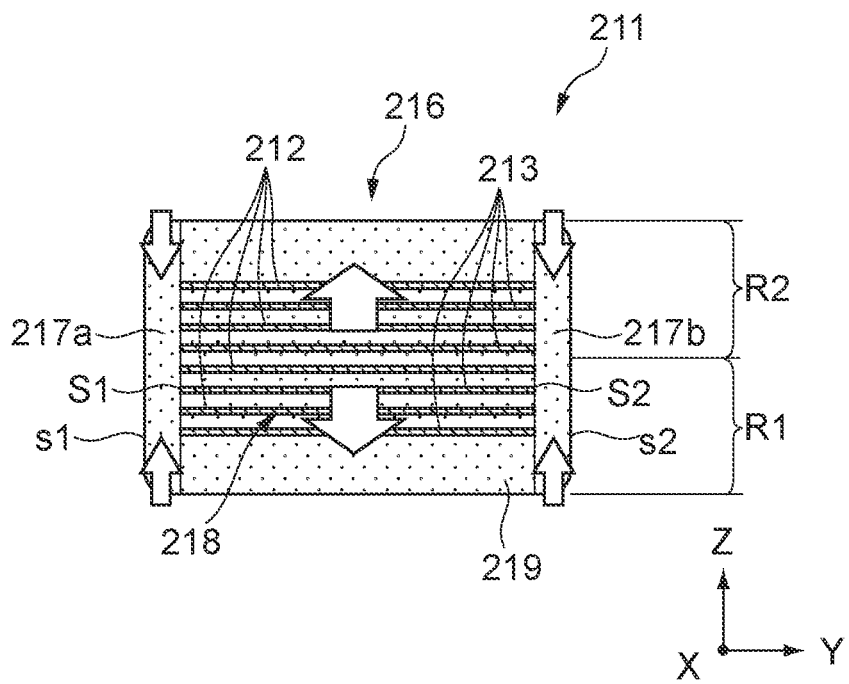
FIG. 10 is a cross-sectional view showing a comparative example of a sintering process in the production method.

FIG. 10 shows a sintering state of a ceramic body 211 according to a comparative example of this embodiment. The ceramic body 211 according to the comparative example is different from the ceramic body 111 according to this embodiment in that side margins 217a and 217b having an uniform thickness are provided to first and second side surfaces S1 and S2 of a multi-layer unit 216, which are orthogonal to the Y axis.

In the ceramic body 211 during sintering, due to the contraction of the side margins 217a and 217b with a low density, a compression force along the Z-axis direction is applied to the first and second side surfaces S1 and S2 of the multi-layer unit 216 in an in-plane direction. In response to the compression force, in the multi-layer unit 216, a tensile stress is mainly applied, to the center region of a capacitance forming unit 218 in the Y-axis direction, in the direction opposite to the compression force applied to the first and second side surfaces S1 and S2.

In the ceramic body 211 according to the comparative example, the side margins 217a and 217b have a uniform thickness, and thus the compression force applied to the first and second side surfaces S1 and S2 of the multi-layer unit 216 is equal in the first region R1 and the second region R2. Thus, in the ceramic body 211, the direction of the tensile stress applied to the capacitance forming unit 218 is the Z-axis direction.

In the ceramic body 211 during sintering, the tensile stress applied to the capacitance forming unit 218 in the Z-axis direction allows the crystal constituting internal electrodes 212 and 213 to easily causes grain growth along the thickness direction. Thus, the circumference of the crystal in which grain growth has been caused in the thickness direction is thinned, and the internal electrodes 212 and 213 are liable to be discontinuous in the in-plane direction.

Figure 11:
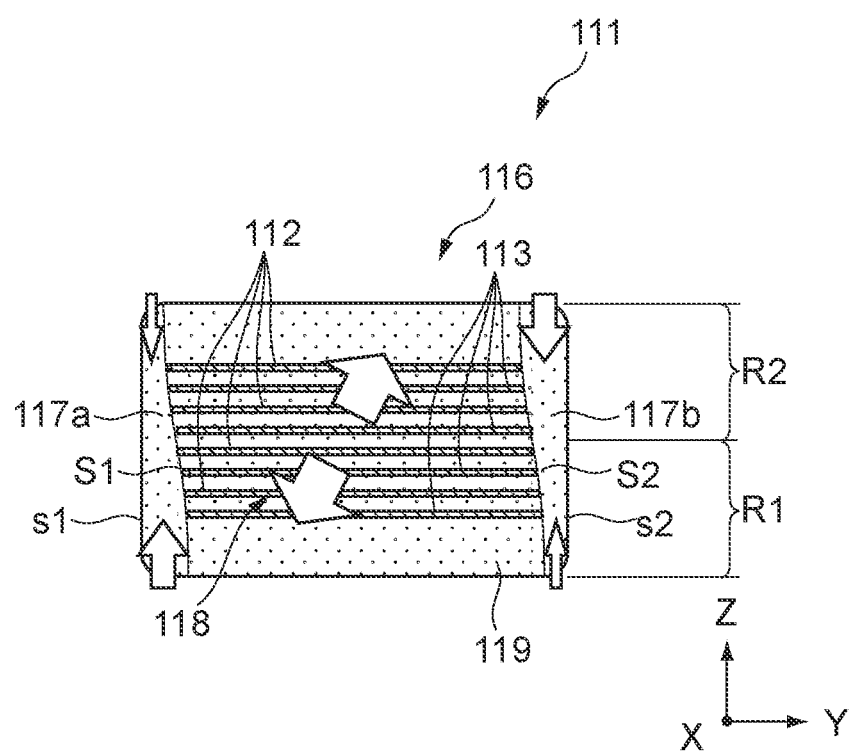
FIG. 11 is a cross-sectional view showing the sintering process in the production method.

FIG. 11 shows a state during the sintering of the ceramic body 111 according to this embodiment. In the ceramic body 111, as described above, the first side margin 117a has a larger average thickness in the first region R1 than in the second region R2, and the second side margin 117b has a larger average thickness in the second region R2 than in the first region R1.

Thus, in the ceramic body 111 during sintering, the contraction force of the first side margin 117a is larger in the first region R1 having a larger average thickness than in the second region R2 having a smaller average thickness. Meanwhile, the contraction force of the second side margin 117b is larger in the second region R2 having a larger average thickness than in the first region R1 having a smaller average thickness.

Therefore, in the multi-layer unit 116, the compression force applied to the first side surface S1 is larger in the first region R1 than in the second region R2, and the compression force applied to the second side surface S2 is larger in the second region R2 than in the first region R1. Thus, in the ceramic body 111, the direction of the tensile stress applied to the capacitance forming unit 118 is inclined in the Y-axis direction with respect to the Z-axis direction.

Therefore, in the ceramic body 111 during sintering, the grain growth of the crystal constituting the first and second internal electrodes 112 and 113, which results from the pressure applied to the capacitance forming unit 118, has a direction including not only a component of the thickness direction but also a component of the in-plane direction. Thus, the continuity of the first and second internal electrodes 112 and 113 in the in-plane direction is likely to be held even if the grain growth of the crystal occurs.

Thus, the multi-layer ceramic capacitor 10 is less likely to cause the reduction in capacitance due to the discontinuity of the first and second internal electrodes 112 and 113 of the capacitance forming unit 118 in the in-plane direction during sintering of the ceramic body 111. Therefore, the reduction in performance due to the stress applied during sintering can be suppressed in the multi-layer ceramic capacitor 10.

Note that, in the multi-layer ceramic capacitor 10, it is favorable that the tensile stress during sintering is not largely shifted from the center region of the capacitance forming unit 118. Thus, during sintering, it is favorable that the compression force applied from the first and second side margins 117a and 117b to the multi-layer unit 116 does not largely differ between the first region R1 and the second region R2.

Thus, in the multi-layer ceramic capacitor 10, it is favorable that the average thickness of the first side margin 17a in the first region R1 is larger than the average thickness of the second side margin 17b in the first region R1, and the average thickness of the second side margin 17b in the second region R2 is larger than the average thickness of the first side margin 17a in the second region R2.

In addition, in the multi-layer ceramic capacitor 10, it is favorable that the average thickness of the first side margin 17a in the first region R1 is equal to the average thickness of the second side margin 17b in the second region R2, and the average thickness of the first side margin 17a in the second region R2 is equal to the average thickness of the second side margin 17b in the first region R1.

Note that "equal" in the comparison of the average thickness between the first and second side margins 17a and 17b means that the average thickness of the second side margin 17b falls within the range of ±5% of the average thickness of the first side margin 17a. Such an average thickness can be measured as an average value of the thicknesses of the first side margin 17a or the second side margin 17b, which are respectively measured at positions obtained when the first region R1 or the second region R2 is divided into five in the Z-axis direction in the cross section shown in FIG. 11, for example.

2.6 Step S06: Formation of External Electrode

In Step S06, the first external electrode 14 and the second external electrode 15 are formed in both the end portions of the ceramic body 11 in the X-axis direction obtained in Step S05, to complete the multi-layer ceramic capacitor 10 shown in FIGS. 1 to 3. The method of forming the first external electrode 14 and the second external electrode 15 in Step S06 is optionally selectable from publicly known methods.

3. Other Embodiments

While the embodiment of the present disclosure has been described, the present disclosure is not limited to the embodiment described above, and it should be appreciated that the present disclosure may be variously modified.

For example, in the multi-layer ceramic capacitor 10 according to this embodiment, the average thickness of each of the first and second side margins 17a and 17b only needs to be set as described above. Thus, in the multi-layer ceramic capacitor 10, the first and second side surfaces S1 and S2 of the multi-layer unit 16 and the side surfaces s1 and s2 of the ceramic body 11 may have different shapes from the above-mentioned configuration.

Further, the above embodiment has described the multi-layer ceramic capacitor 10 as an example of a multi-layer ceramic electronic component, but the present disclosure is applicable to general multi-layer ceramic electronic components. Examples of such multi-layer ceramic electronic components include a chip varistor, a chip thermistor, and a multi-layer inductor.

What is claimed is:

1. A multi-layer ceramic electronic component, comprising:
    a multi-layer unit including
        ceramic layers laminated in a direction of a first axis,
        internal electrodes disposed between the ceramic layers, and
        a first side surface and a second side surface on which end portions of the internal electrodes in a direction of a second axis orthogonal to the first axis are positioned; and
    a first side margin and a second side margin that cover the first side surface and the second side surface, respectively,
    wherein when the first side margin and the second side margin are each divided equally into a first region and a second region along a plane perpendicular to the direction of the first axis,
    the first side margin has a larger average thickness in the first region than in the second region, and
    the second side margin has a larger average thickness in the second region than in the first region.

2. The multi-layer ceramic electronic component according to claim 1, wherein
    each of the first side margin and the second side margin has an outer surface extending along a plane orthogonal to the second axis.

3. The multi-layer ceramic electronic component according to claim 1, wherein
    the average thickness of the first side margin in the first region is larger than the average thickness of the second side margin in the first region, and
    the average thickness of the second side margin in the second region is larger than the average thickness of the first side margin in the second region.

4. The multi-layer ceramic electronic component according to claim 1, wherein
    the average thickness of the first side margin in the first region is equalo the average thickness of the second side margin in the second region, and
    the average thickness of the first side margin in the second region is equal to the average thickness of the second side margin in the first region.

5. The multi-layer ceramic electronic component according to claim 1, wherein
    the first region and the second region are defined on a cross section parallel to a plane including the first axis and the second axis.

6. A method of producing a multi-layer ceramic electronic component, comprising:
    producing a multi-layer sheet including
        ceramic layers laminated in a direction of a first axis, and
        internal electrodes disposed between the ceramic layers;
    producing a multi-layer unit by cutting and singulating the multi-layer sheet, the multi-layer unit having a first side surface and a second side surface being cut surfaces from which end portions of the internal electrodes in a direction of a second axis orthogonal to the first axis are exposed, and the first side surface and the second side surface being inclined in a common direction with respect to a plane orthogonal to the second axis; and
    forming a first side margin and a second side margin on the first side surface and the second side surface, respectively, the first side margin and the second side margin each having an outer surface extending along the plane orthogonal to the second axis, such that when the first side margin and the second side margin are each divided equally into a first region and a second region along a plane perpendicular to the direction of the first axis, the first side margin has a larger average thickness in the first region than in the second region, and the second side margin has a larder average thickness in the second region than in the first region.

7. The method of producing a multi-layer ceramic electronic component according to claim 6, wherein
    the multi-layer sheet is cut with a push-cutting blade vibrated in the direction of the second axis.

8. The method of producing a multi-layer ceramic electronic component according to claim 6, wherein
    the forming a first side margin and a second side margin includes using a side margin sheet, and
    the side margin sheet is attached to the first side surface and the second side surface while deforming the side margin sheet along a shape of each of the first side surface and the second side surface.

9. The method of producing a multi-layer ceramic electronic component according to claim 8, wherein
    the side margin sheet is pressed using a pressing surface with a high rigidity extending along the plane orthogonal to the second axis.

* * * * *